US010035470B2

(12) United States Patent
Pulleyblank

(10) Patent No.: US 10,035,470 B2
(45) Date of Patent: Jul. 31, 2018

(54) RACK-AND-PINION MOUNTING DEVICE FOR VEHICLE-MOUNTED STORAGE CONTAINERS AND ACCESSORIES

(71) Applicant: GM GLOBAL TECHNOLOGY OPERATIONS LLC, Detroit, MI (US)

(72) Inventor: Mark A. Pulleyblank, Harrison Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 170 days.

(21) Appl. No.: 15/251,329

(22) Filed: Aug. 30, 2016

(65) Prior Publication Data

US 2018/0056885 A1    Mar. 1, 2018

(51) Int. Cl.
| | |
|---|---|
| *B60R 9/06* | (2006.01) |
| *E05C 1/08* | (2006.01) |
| *B60R 11/06* | (2006.01) |
| *F16H 19/04* | (2006.01) |

(52) U.S. Cl.
CPC .............. *B60R 9/065* (2013.01); *E05C 1/08* (2013.01); *B60R 11/06* (2013.01); *F16H 19/04* (2013.01)

(58) Field of Classification Search
CPC . B60R 9/065; B60R 11/06; E05C 1/08; F16H 19/04
USPC ......................................................... 296/37.6
See application file for complete search history.

(56) References Cited

U.S. PATENT DOCUMENTS

| | | | |
|---|---|---|---|
| 5,439,150 A | 8/1995 | Trahms | |
| 6,139,080 A * | 10/2000 | Saffold | ..................... B60R 9/00 292/145 |
| 6,464,277 B2 * | 10/2002 | Wilding | .................... B60R 9/00 224/404 |
| 6,626,480 B2 | 9/2003 | Anderson | |
| 7,651,146 B2 * | 1/2010 | Anderson | ................. B60R 7/02 296/37.6 |
| 7,819,295 B2 * | 10/2010 | Plavetich | ................ B60P 1/435 224/403 |
| 8,052,019 B2 * | 11/2011 | Plavetich | .................. B60P 3/06 224/403 |
| 8,393,665 B2 * | 3/2013 | Villano | ................... B60R 11/06 224/403 |
| 9,193,290 B2 * | 11/2015 | Lazarevich | ............... B60P 3/14 |
| 2002/0030373 A1 | 3/2002 | Brady | |
| 2005/0194816 A1 * | 9/2005 | Kiester | .................. B62D 33/02 296/182.1 |

(Continued)

*Primary Examiner* — Pinel E Romain
(74) *Attorney, Agent, or Firm* — Quinn IP Law

(57) ABSTRACT

Disclosed are rack-and-pinion mounting devices, methods for making and methods for using such devices, and motor vehicles with storage containers secured by rack-and-pinion mounting devices. A mounting device is disclosed for attaching an accessory to a surface. The mounting device includes a latch housing that mounts to the accessory (or surface). A bolt latch, which is slidably coupled to the housing, includes a linear gear bar and locking pins. These locking pins engage tie-down loops attached to the surface (or accessory). A pinion gear is rotatably coupled to the housing and intermeshed with the gear bar. Spinning the pinion gear in one direction slides the bolt latch to disengage the locking pins from the loops and detach the accessory from the surface. Spinning the pinion gear in the opposite direction slides the bolt latch to engage the locking pins with the loops and attach the accessory to the surface.

20 Claims, 2 Drawing Sheets

(56) References Cited

U.S. PATENT DOCUMENTS

| | | | |
|---|---|---|---|
| 2016/0280144 A1* | 9/2016 | Hemphill | B60P 7/08 |
| 2017/0001570 A1* | 1/2017 | Murray | B60R 7/04 |
| 2018/0086186 A1* | 3/2018 | Haag | B60J 7/042 |

* cited by examiner

RACK-AND-PINION MOUNTING DEVICE FOR VEHICLE-MOUNTED STORAGE CONTAINERS AND ACCESSORIES

TECHNICAL FIELD

The present disclosure relates generally to systems, methods and devices for securing vehicle-mounted accessories to motor vehicles. More specifically, aspects of this disclosure relate to quick-release mounting mechanisms for anchoring utility storage bins within the rear cargo area of a pickup truck or other cargo transport vehicle.

BACKGROUND

Many conventional motor vehicles, such as the modern-day automobile, are originally equipped with a dedicated storage area next to the passenger compartment for stowing personal effects and belongings. A traditional trunk compartment, for example, is a large storage bin that is located at the rear of the vehicle and covered by a trunk lid that is hinged underneath the passenger compartment's rear deck. By comparison, the dedicated storage area of a pickup truck and other cargo transport vehicles (e.g., sport utility vehicles (SUV), cargo vans, box trucks, etc.) is typified by a rear cargo compartment that is closed off at the tail end by a hinged liftgate, tailgate or door assembly. Truck cargo compartments normally offer more storage volume than their conventional trunk counterparts by providing increased floor space with an elevated cargo ceiling (vans, SUVs, box trucks, etc.) or an open cargo area without a ceiling (pickups, flatbeds, etc.).

Pickup trucks and other cargo transport vehicles are frequently used as commercial work vehicles because the increased storage volume of their rear cargo compartment provides extra space for hauling oversized equipment, tools and trade supplies. The rear cargo compartment may be customized with storage boxes, shelving, or racks to accommodate more specific storage needs. To secure and safeguard expensive tools and equipment, for example, the cargo compartment can be retrofit with a truck bed storage box composed of a lockable lid that is coupled by double-acting butt hinges to a rigid basin. These storage boxes are typically affixed to a forward portion of the cargo bed, e.g., adjacent the vehicle cab, or along the sidewalls of the cargo bed, e.g., adjacent a wheel well. Oftentimes fabricated from high-gauge, rust-resistant aluminum or steel, the basin of a conventional storage box is normally anchored directly to the truck bed by bolts or screws that are driven through the cargo bed floor or sidewalls and into the truck frame. Other designs require permanently installed mounting brackets or rails to secure the storage container to the cargo bed.

SUMMARY

Disclosed herein are rack-and-pinion mounting devices for vehicle-mounted storage containers and accessories, methods for making and methods for using such rack-and-pinion mounting devices, and motor vehicles with a utility storage container secured to the vehicle's cargo compartment with a rack-and-pinion mounting device. By way of example, and not limitation, a novel quick release rack-and-pinion mounting mechanism is presented for anchoring a side-mount storage box to a cargo bed wall of a truck. In this example, the mounting device includes a latch housing that secures to the outboard facing (outside) surface of a storage box sidewall. A sliding bolt latch is movably mounted within an interior compartment of the latch housing. Opposing ends of the sliding bolt latch include locking pins that thread with tie-down loops or other complementary structure of the cargo bed wall. A pinion gear is rotatably coupled, e.g., via a gear shaft or dedicated pinion housing, to the latch housing and intermeshed with teeth of a linear gear bar (known as a "rack") formed in or otherwise attached to the sliding bolt latch. While mounted to the outside of the storage box, the pinion gear can be manually or automatically driven from inside the storage box, e.g., after removal of a rubber access plug that helps to seal the inside of the box.

Spinning of the pinion gear in a first (clockwise) direction will slide the bolt latch in a first (upward) direction and thereby disengage the locking pins from the tie-down loops. Conversely, to anchor the storage box to the cargo compartment sidewall, the pinion gear is spun in a second (counterclockwise) direction to slide the bolt latch in a second (downward) direction, opposite that of the first, and thereby engage each of the locking pins with a respective tie-down loop. For at least some configurations, the latch housing is formed with loop apertures into which are received the tie-down loops for engagement with the locking pins. An optional locking mechanism can be provided to disengage the pinion gear from the rack and thereby prevent the inadvertent disengagement of the bolt latch from the tie-down loops. Alternatively, the locking mechanism may comprise a shim or pawl that selectively engages the pinion gear and/or rack to prevent unwanted movement thereof.

Attendant benefits for at least some of the disclosed concepts include a "quick connect" coupling mechanism for easily and securely anchoring a utility storage container or other vehicle-mounted accessory to the vehicle. At the same time, disclosed coupling mechanisms offer "quick release" functionality for rapidly disconnecting the vehicle-mounted accessory from the vehicle, e.g., to simplify cleaning or use of the entire cargo bed. At least some of the disclosed designs eliminate the need for driving screws, bolts or other fasteners into the cargo bed base or sidewalls to anchor the accessory. In the same vein, there is no need for installing dedicated mounting brackets or mounting rails to securely couple the vehicle-mounted accessory to the vehicle. This, in turn, reduces part and labor costs, improves customer satisfaction, and minimizes potential warranty claims. Some or all of the disclosed designs also help to prevent unwanted scratching and rusting of the cargo bed area that results from prior art mounting means and methods.

Aspects of the present disclosure are directed to quick-release rack-and-pinion mounting mechanisms for anchoring storage containers and other vehicle-mounted accessories to motor vehicles, such as pickup trucks and other cargo transport vehicles. Disclosed, for example, is a mounting device for attaching a vehicle-mounted accessory, such as utility storage containers, transport racks, headache racks, shelving decks, etc., to a motor vehicle. The mounting device includes a latch housing that mounts to the vehicle-mounted accessory (or to the motor vehicle). A bolt latch, which is slidably coupled to the latch housing, includes a linear gear bar and one or more locking pins. Each locking pin engages with complementary mounting structure, such as a tie-down loop, of the motor vehicle (or, alternatively, of the vehicle-mounted accessory). A pinion gear is rotatably coupled to the latch housing and intermeshed with the bolt latch's linear gear. Spinning the pinion gear in a first rotational direction will slide the bolt latch in a first translational direction and thereby disengage the locking pin from the mounting structure to detach the vehicle-mounted accessory from the motor vehicle. Conversely, spinning the pinion gear in a second rotational direction slides the bolt latch in a second translational direction and thereby engages the locking pin with the mounting structure to attach the vehicle-mounted accessory to the motor vehicle.

Other aspects of the present disclosure are directed to motor vehicles with a utility storage container that is anchored to the vehicle by a quick-release mounting mechanism. A "motor vehicle," as used herein, may include any relevant vehicle platform, such as passenger vehicles (internal combustion engine (ICE), hybrid, electric, fuel cell, etc.), commercial vehicles, industrial vehicles, tracked vehicles, all-terrain vehicles (ATV), farm equipment, boats, trains, airplanes, spacecraft, etc. In an example, a motor vehicle is disclosed that includes a vehicle body with a rear cargo compartment aft of a passenger compartment. The rear cargo compartment may be enclosed, such as for van, SUV, and box truck applications, or uncovered, such as for pickup truck and flatbed truck applications. The rear cargo compartment includes a cargo bed adjoined at an end thereof by a cargo sidewall with a pair of tie-down loops attached thereto. Located in the rear cargo compartment is a vehicle-mounted storage container that includes a container basin that is seated on the cargo bed and covered by a lid.

The motor vehicle also includes a rack-and-pinion quick-release mounting device that anchors the storage container to the cargo compartment. The mounting device is composed of a latch housing that is rigidly mounted, e.g., by bolts, to the basin of the storage container. Slidably mounted within an interior compartment of the latch housing is a slidable bolt latch. This bolt latch includes a linear gear bar and a pair of locking pins, each of which is releasably engaged with a respective one of the tie-down loops. A pinion gear is rotatably coupled to the latch housing, e.g., via a pinion housing, and intermeshed with the bolt latch's linear gear bar. To detach the storage container from the cargo sidewall, the pinion gear is spun in a first rotational direction; this operates to slide the bolt latch in a first translational direction and thereby disengage the locking pins from the tie-down loops. However, to reattach the storage container to the cargo sidewall, the pinion gear is spun in a second rotational direction, opposite the first rotational direction; this operates to slide the bolt latch in a second translational direction, opposite the first translational direction, and thereby reengage the locking pins with the tie-down loops.

Additional aspects of this disclosure are directed to methods of making and methods of using quick-release rack-and-pinion mounting mechanisms for anchoring storage containers and other vehicle-mounted accessories to motor vehicles. For instance, a method is disclosed for constructing a mounting device for attaching a vehicle-mounted accessory to a motor vehicle. The method includes, in any order and in any combination: forming a latch housing that is configured to mount to one of the vehicle-mounted accessory or the motor vehicle; slidably coupling a bolt latch to the latch housing, the bolt latch including a linear gear bar and a locking pin, which is configured to engage complementary mounting structure of the other of the vehicle-mounted accessory or the motor vehicle; and rotatably coupling a pinion gear to the latch housing such that the pinion gear intermeshes with the linear gear bar of the bolt latch. Once assembled, spinning the pinion gear in a first rotational direction slides the bolt latch in a first translational direction and thereby disengages the locking pin from the mounting structure. This will detach the vehicle-mounted accessory from the motor vehicle. However, spinning the pinion gear in a second rotational direction slides the bolt latch in a second translational direction and thereby engages the locking pin with the mounting structure. This will attach the vehicle-mounted accessory to the motor vehicle. The disclosed methods can include additional or alternative steps, including forming the linear gear bar and locking pin with the sliding bolt latch as a single-piece, unitary structure. As another example, the method can include mounting a pinion housing to the latch housing, the pinion gear being nested within and rotatably coupled to the linear gear bar by the pinion housing.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and representative modes for carrying out the present disclosure when taken in connection with the accompanying drawings and the appended claims.

Figure 1:
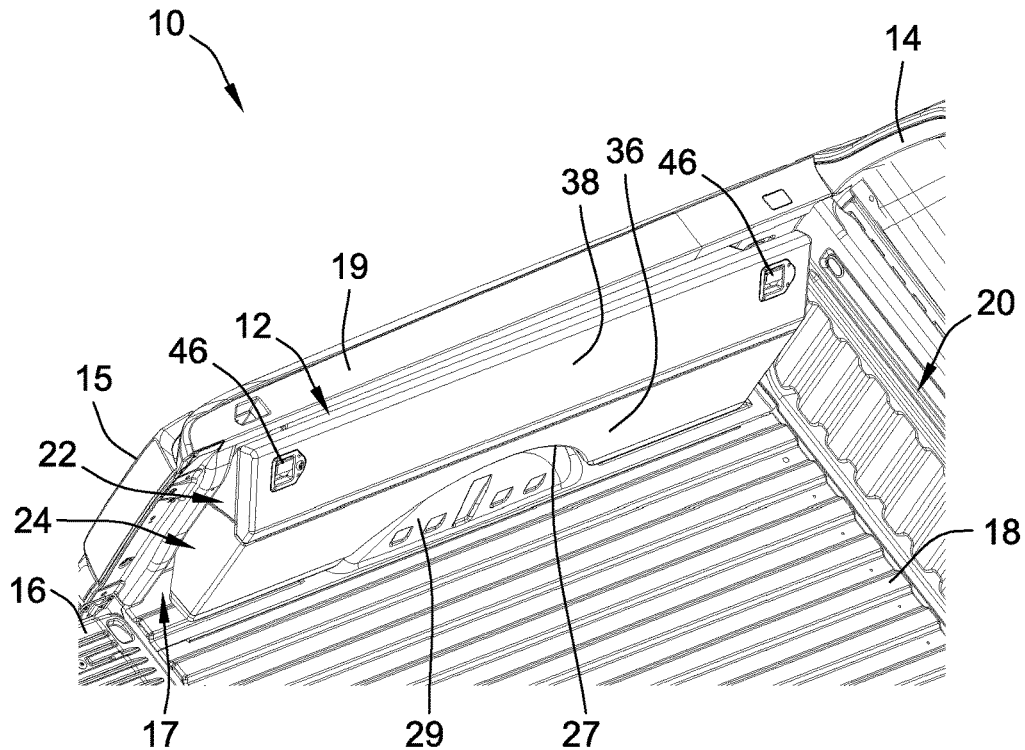
FIG. 1 is an elevated rear-perspective-view illustration of a representative motor vehicle with a utility storage container anchored to the vehicle's rear cargo area via a rack-and-pinion mounting device in accordance with aspects of the present disclosure.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, and alternatives falling within the spirit and scope of the disclosure as defined by the appended claims.

DETAILED DESCRIPTION OF THE ILLUSTRATED EMBODIMENTS

This disclosure is susceptible of embodiment in many different forms. There are shown in the drawings and will herein be described in detail representative embodiments of the disclosure with the understanding that the present disclosure is to be considered as an exemplification of the principles of the disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Referring now to the drawings, wherein like reference numbers refer to like features throughout the several views, there is shown in FIG. 1 a perspective-view illustration of a representative automobile, which is designated generally at 10 and portrayed herein for purposes of discussion as a pickup truck-style commercial vehicle. Mounted at a rearward portion of the automobile 10, e.g., aft of a passenger compartment 14 and forward of a tailgate 16, is a utility storage container 12 that is seated on a cargo bed 18 within a rear cargo compartment 20. The illustrated automobile 10—also referred to herein as "motor vehicle" or "vehicle" for short—is merely an exemplary application with which the novel aspects and features of this disclosure can be practiced. In the same vein, the implementation of the present concepts for a longitudinally mounted truck box should also be appreciated as an exemplary application of the novel concepts disclosed herein. As such, it will be understood that the aspects and features of the present disclosure can be applied to other vehicle-mounted accessories and utilized for any logically relevant type of motor vehicle. Lastly, the drawings presented herein are not necessarily to scale and are provided purely for instructional purposes. Thus, the specific and relative dimensions shown in the drawings are not to be construed as limiting.

There is shown in FIG. 1 a representative vehicle-mounted utility storage container 12 (also referred to herein as "storage bin" or "truck box") for stowing and transporting, e.g., equipment, tools, supplies or any other items desired by the user. According to the illustrated example, the utility storage container 12 is generally constructed as a bipartite assembly composed of an articulated door assembly 24 connected to an elongated container basin 22. The utility storage container 12 can be constructed, for example, from a pressure-molded or blow-molded polymer, such as Polyethylene Terephthalate (PET), Polypropylene (PP), Polyvinyl Chloride (PVC), from 50-65 gauge smooth or tread plate aluminum or steel, combinations thereof, or any other material suitable for the intended application of the container. The illustrated utility storage container 12 is exemplified as a full-length, side-mount truck box designed to mount on either side of the cargo bed 18, e.g., extending substantially the entire length of the cargo bed 18. Optional variations can be modified to a desired half-length side box or a transversely mounted saddle box seated at a forward end of the cargo bed 18. In this regard, it should be appreciated that the container 12 can take on any of an assortment of sizes, orientations, and geometries within the scope of this disclosure.

Figure 2:
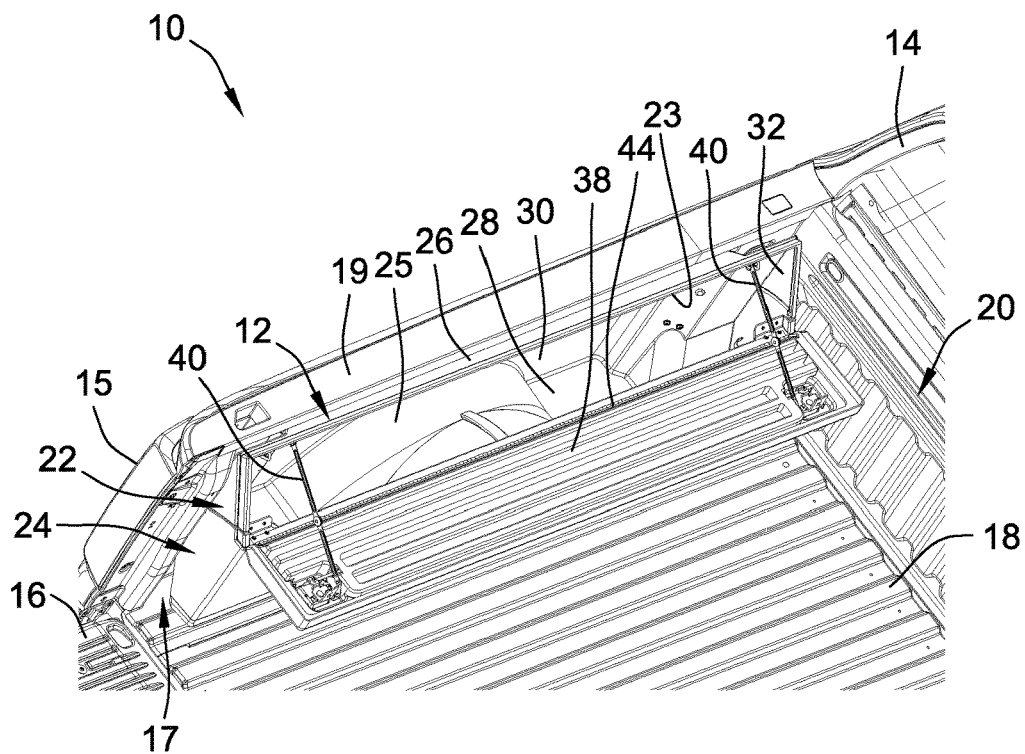
FIG. 2 is another perspective-view illustration of the representative motor vehicle of FIG. 1, showing the door of the utility storage container in an open position.

It is desirable, for at least some configurations, that the utility storage container 12 be designed to conform to the internal geometry and cavities present in the rear cargo compartment 20 to help minimize the amount of functional cargo space occupied by the utility storage container 12 and so as to not interfere with use of the tailgate 16 or aftermarket camper shells and tonneau bed covers. According to the illustrated example, the container basin 22 includes an elongated base 26 in opposing spaced-relationship to an elongated roof 28, as can be seen in FIG. 2. Opposing lateral and opposing longitudinal planar sidewalls 30 and 32, respectively, project generally orthogonally from the base 26 such that the sidewalls 30, 32 structurally interconnect the base 26 and roof 28. The base 26, roof 28 and sidewalls 30, 32 cooperatively define an internal storage volume with a basin opening 23. By way of non-limiting example, the illustrated utility storage container 12 provides at least approximately five (5) cubic feet of enclosed storage volume. To provide a side-access container, the basin opening can be defined along a longitudinally oriented plane that is obliquely angled with respect to the base 26 and roof 28.

Adjoining the lateral ends of the cargo bed 18 are opposing cargo sidewalls, labelled at 15 in FIG. 1 (only one of which can be seen in the drawings; a mirror counterpart is disposed at the opposite lateral end of the bed). The cargo bed 18 and cargo sidewall 15, including sidewall overhang 19, cooperatively define a cavity 17 (FIG. 1) into which is nested a portion of the container basin 22. Once properly seated, the elongated container basin 22 is mechanically attached to the cargo sidewall 15, e.g., via one or more quick-release mounting mechanisms 50, as will be discussed in extensive detail hereinbelow. To accommodate the foregoing positioning of the utility storage container 12, the base 26 of the container basin 22 incorporates an integrally formed arcuate well cap 25 (FIG. 2) that is disposed between the basin sidewalls 30, 32 and shaped to nest therein a wheel well 29 of the cargo bed 18. The articulated door assembly 24 is provided with a complementary arcuate well cap 27 that is similar in shape and size with the basin's well cap 25 to extend around and partially circumscribe the wheel well 29. The door's well cap 27 fits generally flush within the basin's well cap 27 such that the base 26 contemporaneously seats on the cargo bed 18 and wheel well 29 for subjacent support of the utility storage container 12.

With continuing reference to FIGS. 1 and 2, the articulated door assembly 24 is composed of multiple door segments, such as first and second door segments 36 and 38, respectively, that are interconnected to each other and to the container basin 22 by one or more flexible joints. By way of example, and not limitation, the first door segment 36, which is an elongated component terminating at opposing ends with orthogonal flanges to define a generally U-shaped cross-section, extends longitudinally along the length of the container basin 22. Likewise, the second door segment 38, which is an elongated, generally rectangular component with round-chamfered edges defining a lip, also extends longitudinally along the length of the container basin 22 generally parallel to the first door segment 36. To provide relative movement between the articulated door assembly 24 and the container basin 22, the first door segment 36 is pivotably coupled to the container basin 22, e.g., via a hinge joint. To provide relative movement between the two door segments, the second door segment 38 is pivotably coupled to the first door segment 36 via a piano hinge 44 that extends substantially continuously along approximately the entire length of the articulated door assembly 24, as seen in FIG. 2. Lockable flush-mounted paddle latches 46 may be provided to rigidly secure the two door segments 36, 38 to the basin 22 and thereby retain the door assembly 24 in the closed position. Optional check straps 40 mechanically couple the second door segment 38 to the container basin 22.

Figure 3:
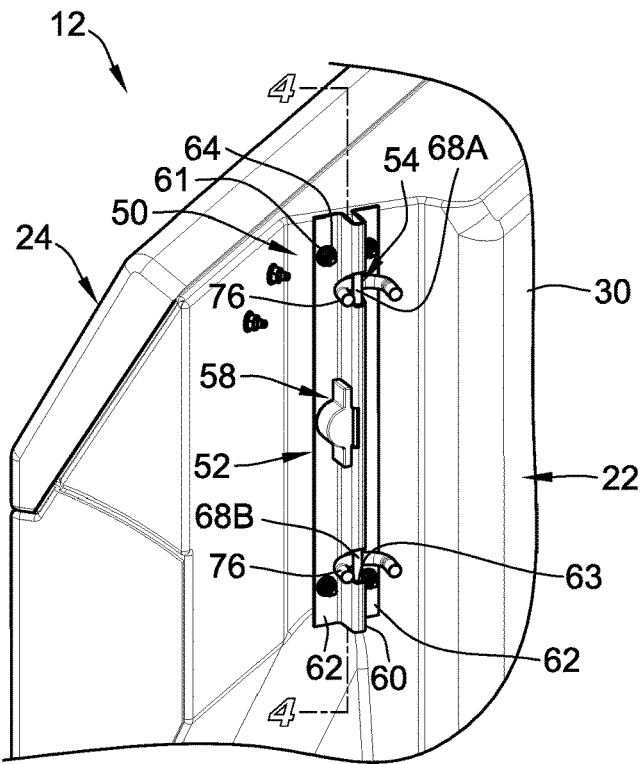
FIG. 3 is a perspective-view illustration of the back of the utility storage container of FIG. 1, showing the rack-and-pinion mounting device rigidly anchoring the storage container to tie-down tabs projecting from a sidewall of the rear cargo area.

Turning next to FIG. 3, there is shown a representative quick-connect, quick-release rack-and-pinion mounting mechanism 50 for anchoring the vehicle-mounted accessory 12 within the rear cargo compartment 20 of the vehicle 10.

In accord with the illustrated example, the rack-and-pinion mounting mechanism 50 (referred to interchangeably as "mounting device") is generally composed of four parts: a latch housing 52, a slidable bolt latch 54, a pinion gear 56 (FIG. 4) and a pinion housing 58. The latch housing 52 mounts the entire assembly 50 to a select portion of the vehicle-mounted accessory 12 or, if so desired, to a select portion of the motor vehicle 10. FIG. 3, for example, portrays the latch housing 52 fabricated with a U-shaped central body 60 and a pair of mounting flanges 62 projecting obliquely from opposing sides of the central body 60. For simplicity of construction, central body 60 and mounting flanges 62 can be integrally formed as a single-piece structure, e.g., from extruded aluminum, stamped steel sheet, hydroformed polymer, or any other suitable material. Each mounting flange 62 includes one or more fastener holes 61 that receive therethrough fasteners 64 that mate with the basin 24 to thereby couple the mounting device 50 to an outboard facing surface of the basin sidewall 30 (or to an inboard facing surface of cargo sidewall 15). It should be appreciated that the latch housing 52 can take on a vast number of shapes, sizes, formats, attachment locations, and mounting orientations. By way of non-limiting example, the latch housing 52 can take on the form of a skeletal bracket rather than an enclosure-like structure as shown.

Figure 4:
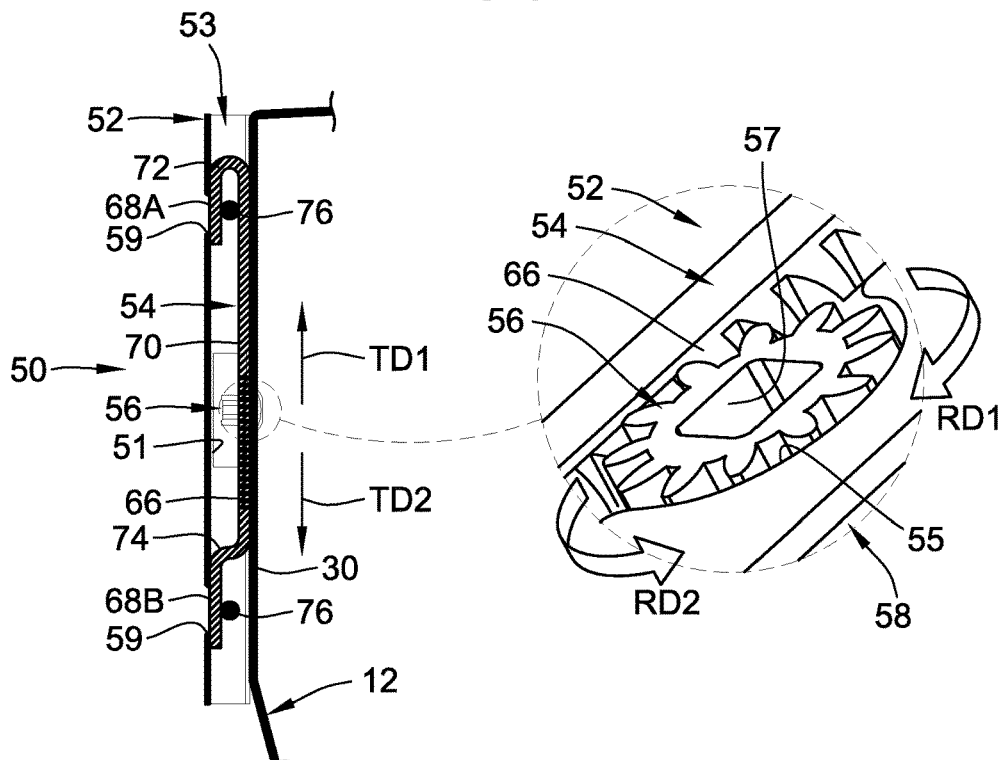
FIG. 4 is a cross-sectional side-view illustration of the rack-and-pinion mounting device of FIG. 3 taken along line 4-4.

Latch housing 52 defines an elongated interior compartment 53 that spans, according to the illustrated example, the entire height of the device 50. Reciprocally mounted inside the housing's interior compartment 53 is a bolt latch 54 that slides rectilinearly in a first translational direction TD1 (upward in FIG. 4) and a second translational direction TD2 (downward in FIG. 4). As seen in FIG. 4, the bolt latch 54 is fabricated with a linear gear bar 66, which is attached to or cut along a straight segment 70 of the bolt latch's body, and one or more locking pins, such as first and second locking pins 68A and 68B, respectively, which project from opposing ends of the latch body. A first end of the bolt latch 54, for example, includes a hook (or hooked segment) 72 while a second end of the bolt latch 54, which is on the opposite side of the latch body's straight segment 70, includes a stepped arm (or stepped segment) 74. The topmost locking pin 68A projects from the shank of hook 72, whereas the bottommost locking pin 68B projects from the elbow of stepped arm 74, both pointing in the same direction as the second translational direction TD2 (downwardly in FIG. 4). While an assortment of structural configurations are envisioned, the bolt latch 54 of FIG. 4 is shown as an elongated, cylindrical structure with the linear gear bar 66 and locking pins 68A, 68B integrally formed with the straight segment 70 such that the bolt latch 54 is a single-piece unitary structure. It is also within the scope of this disclosure to separately fabricate the various segments of the bolt latch and thereafter interconnect these segments to form the final component. Protective end caps (not shown) can be friction fit or otherwise attached to the top and bottom of the latch housing 52 to close off the opposing ends of the interior compartment 53.

An inset view is provided in FIG. 4 to more clearly show the pinion gear 56 rotatably coupled to the latch housing 52 and intermeshed with the linear gear bar 66 of the bolt latch 54. A variety of methods can be employed to rotatably couple the pinion gear 56 to the latch housing 52, such as with a gear shaft, bearing assembly, etc. In a non-limiting example, the pinion housing 58 of FIGS. 3 and 4 is snap-fit onto or otherwise coupled to a fore or aft surface of the central body 60 of latch housing 52. In so doing, the pinion gear 56 is trapped between the latch housing 52 and pinion housing 58 such that the pinion 56 can nestably rotate inside a cylindrical pocket 55 of the pinion housing 58. The latch housing 52 is formed with a rectangular window 51 (FIG. 4) that allows the teeth of the pinion gear 56 to project out of the pinion housing 58, through the latch housing window 51, and into the latch housing 52 to operatively mesh with the teeth of the bolt latch's linear gear bar 66. Manual or automated means can be employed to rotate the pinion gear 56. By way of example, and not limitation, the pinion gear 56 of FIG. 4 is provided with a tool drive feature, which is shown as a rectangular drive slot 57, that operatively mates with a tool bit or head, such as a square-head screw driver or square socket head, such that rotation of the tool bit/head spins the pinion gear 56.

Each of the bolt latch's locking pins 68A, 68B is designed to engage complementary mounting structure of the motor vehicle to anchor the storage container 12 to the vehicle 10. In alternative configurations, e.g., where the latch housing 52 of the rack-and-pinion mounting mechanism 50 is rigidly mounted to the vehicle body, the locking pins 68A, 68B will operatively engage with complementary mounting structure of the vehicle-mounted storage container 12. In either instance, the complementary mounting structure can take on a variety of forms; in FIGS. 3 and 4, for example, the mounting structure is comprised of a pair of tie-down loops 76 projecting from the cargo sidewall 15. As an optional structural feature, the latch housing 52 is formed with a pair of loop apertures 59, each of which is shaped and sized to receive therein a respective one of the tie-down loop 76. These loop apertures 59 can include a ramped surface 63 that engages with and aligns one of the tie-down loops 76 with a corresponding one of the locking pins 68A, 68B.

As seen in FIG. 4, each locking pin 68A, 68B threads into a respective one of the tie-down loops 76 to thereby attach the vehicle-mounted accessory 12 to the motor vehicle 10. In particular, if the pinion gear 56 is spun in a first rotational direction (illustrated by clockwise arrow RD1 in the inset view of FIG. 4), the intermeshing gear teeth of the rack 66 and pinion 56 will cause the bolt latch 54 to slide in the first translational direction TD1 and thereby unthread or otherwise disengage the locking pins 68A, 68B from the tie-down loops 76. This operation will detach the vehicle-mounted accessory 12 from the cargo compartment sidewall 15 of the motor vehicle 10, e.g., such that the accessory 12 can be readily removed from the cargo compartment 20. Conversely, if the pinion gear 56 is spun in a second rotational direction (illustrated by counterclockwise arrow RD2 in FIG. 4), the intermeshing gear teeth of the rack 66 and pinion 56 will cause the bolt latch 52 to slide in the opposite translational direction TD2 and thereby thread or otherwise engage the locking pins 68A, 68B with the tie-down loops 76. This threading operation will securely anchor the vehicle-mounted accessory 12 to the cargo compartment sidewall 15.

While aspects of the present disclosure have been described in detail with reference to the illustrated embodiments, those skilled in the art will recognize that many changes may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and features.

What is claimed:

1. A mounting device for attaching an accessory to a surface, the mounting device comprising:
    a latch housing configured to mount to one of the accessory or the surface;
    a bolt latch slidably coupled to the latch housing, the bolt latch including a linear gear bar and a locking pin, the locking pin being configured to engage complementary mounting structure of the other of the accessory or the surface; and
    a pinion gear rotatably coupled to the latch housing and intermeshed with the linear gear bar of the bolt latch,
    wherein spinning of the pinion gear in a first rotational direction slides the bolt latch in a first translational direction and thereby disengages the locking pin from the mounting structure such that the accessory detaches from the surface, and
    wherein spinning of the pinion gear in a second rotational direction slides the bolt latch in a second translational direction and thereby engages the locking pin with the mounting structure such that the accessory attaches to the surface.

2. The mounting device of claim 1, wherein the locking pin includes first and second locking pins projecting from opposing first and second ends, respectively, of the bolt latch.

3. The mounting device of claim 2, wherein the first end of the bolt latch includes a hook and the second end of the bolt latch includes a stepped arm, the first locking pin projecting from the hook and the second locking pin projecting from the stepped arm.

4. The mounting device of claim 2, wherein the complementary mounting structure includes a pair of tie-down loops, and wherein each of the locking pins is configured to thread into a respective one of the tie-down loops to thereby attach the accessory to the surface.

5. The mounting device of claim 1, wherein the latch housing defines an interior compartment, the bolt latch being slidably mounted within the interior compartment.

6. The mounting device of claim 5, wherein the complementary mounting structure includes a tie-down loop, and wherein the latch housing includes a loop aperture configured to receive the tie-down loop to engage with the locking pin.

7. The mounting device of claim 6, wherein the loop aperture includes a ramped surface configured to engage with and align the tie-down loop with the locking pin.

8. The mounting device of claim 1, further comprising a pinion housing mounted to the latch housing, the pinion gear being nested within the pinion housing.

9. The mounting device of claim 8, wherein the latch housing defines a window, and wherein teeth of the pinion gear project out of the pinion housing, through the window in the latch housing, and intermesh with teeth of the linear gear bar of the bolt latch.

10. The mounting device of claim 1, wherein the pinion gear includes a tool drive feature configured to mate with a tool bit or head such that rotation of the tool bit or head spins the pinion gear.

11. The mounting device of claim 1, wherein the latch housing includes a pair of mounting flanges with fastener holes configured to receive therethrough fasteners to thereby couple the mounting device to one of the accessory or the surface.

12. The mounting device of claim 1, wherein the linear gear bar and the locking pin are integrally formed with the bolt latch as a single-piece unitary structure.

13. The mounting device of claim 1, wherein the accessory is a vehicle-mounted accessory, and wherein the surface is a surface of a motor vehicle.

14. A motor vehicle, comprising:
    a vehicle body with a rear cargo compartment aft of a passenger compartment, the rear cargo compartment including a cargo bed and a cargo sidewall with a pair of tie-down loops attached thereto;
    a vehicle-mounted storage container disposed in the rear cargo compartment, the storage container including a container basin seated on the cargo bed and covered by a lid; and
    a rack-and-pinion quick-release mounting device, comprising:
        a latch housing rigidly mounted to the basin of the storage container;
        a bolt latch slidably mounted within an interior compartment of the latch housing, the bolt latch including a linear gear bar and a pair of locking pins, each of the locking pins being releasably engaged with a respective one of the tie-down loops; and
        a pinion gear rotatably coupled to the latch housing and intermeshed with the linear gear bar of the bolt latch,
    wherein spinning of the pinion gear in a first rotational direction slides the bolt latch in a first translational direction and thereby disengages the locking pins from the tie-down loops such that the storage container detaches from the cargo sidewall, and
    wherein spinning of the pinion gear in a second rotational direction, opposite the first rotational direction, slides the bolt latch in a second translational direction, opposite the first translational direction, and thereby reengages the locking pins with the tie-down loops such that the storage container reattaches to the cargo sidewall.

15. A method of constructing a mounting device for attaching an accessory to a surface, the method comprising:
    forming a latch housing configured to mount to one of the accessory or the surface;
    slidably coupling a bolt latch to the latch housing, the bolt latch including a linear gear bar and a locking pin, the locking pin being configured to engage complementary mounting structure of the other of the accessory or the surface; and
    rotatably coupling a pinion gear to the latch housing such that the pinion gear intermeshes with the linear gear bar of the bolt latch,
    wherein spinning of the pinion gear in a first rotational direction slides the bolt latch in a first translational direction and thereby disengages the locking pin from the mounting structure such that the accessory detaches from the surface, and
    wherein spinning of the pinion gear in a second rotational direction slides the bolt latch in a second translational direction and thereby engages the locking pin with the mounting structure such that the accessory attaches to the surface.

16. The method of claim 15, wherein the locking pin includes first and second locking pins projecting from opposing first and second ends, respectively, of the bolt latch.

17. The method of claim 16, wherein the first end of the bolt latch includes a hook and the second end of the bolt latch includes a stepped arm, the first locking pin projecting from the hook and the second locking pin projecting from the stepped arm.

18. The method of claim 15, wherein the latch housing defines an interior compartment, the bolt latch being slidably mounted within the interior compartment.

19. The method of claim 15, further comprising mounting a pinion housing to the latch housing, the pinion gear being nested within the pinion housing.

20. The method of claim 15, further comprising integrally forming the linear gear bar and the locking pin with the bolt latch as a single-piece unitary structure.

* * * * *